United States Patent
Shih et al.

(10) Patent No.: US 7,309,731 B2
(45) Date of Patent: Dec. 18, 2007

(54) INK-RECEPTIVE COATINGS, COMPOSITES AND ADHESIVE-CONTAINING FACESTOCKS AND LABELS

(75) Inventors: Frank Yen-Jer Shih, Arcadia, CA (US); Walter J. Kras, Santa Ana, CA (US); Valery Golub, Highland, IN (US)

(73) Assignee: Avery Dennison Corporation, Pasadena, CA (US)

( * ) Notice: Subject to any disclaimer, the term of this patent is extended or adjusted under 35 U.S.C. 154(b) by 411 days.

(21) Appl. No.: 10/704,515

(22) Filed: Nov. 7, 2003

(65) Prior Publication Data

US 2004/0242758 A1 Dec. 2, 2004

Related U.S. Application Data

(63) Continuation-in-part of application No. 10/452,885, filed on Jun. 2, 2003, now abandoned.

(51) Int. Cl.
*C08L 67/00* (2006.01)
(52) U.S. Cl. ..................... 524/513; 525/165
(58) Field of Classification Search ................ 525/165
See application file for complete search history.

(56) References Cited

U.S. PATENT DOCUMENTS

| | | | | |
|---|---|---|---|---|
| 4,868,581 A | | 9/1989 | Mouri et al. ................. 346/1.1 |
| 4,883,717 A | * | 11/1989 | Kitamura et al. ............ 428/458 |
| 5,084,304 A | * | 1/1992 | Lienert et al. ............ 427/388.2 |
| 5,183,863 A | * | 2/1993 | Nakamura et al. ........... 525/438 |
| 5,256,721 A | * | 10/1993 | Wilson et al. ............... 524/539 |
| 5,356,858 A | | 10/1994 | Yabuta et al. ................ 503/227 |
| 5,446,082 A | | 8/1995 | Asai et al. .................. 524/389 |
| 5,939,467 A | * | 8/1999 | Wnuk et al. ................. 523/128 |
| 5,948,729 A | | 9/1999 | Landry-Coltrain et al. . 503/227 |
| 6,106,950 A | * | 8/2000 | Searle et al. ............. 428/423.1 |
| 6,159,549 A | * | 12/2000 | Sundararaman et al. .... 427/410 |
| 6,200,683 B1 | * | 3/2001 | Montague et al. .......... 428/430 |
| 6,410,199 B1 | | 6/2002 | Ikeuchi et al. ............... 430/124 |
| 6,673,744 B1 | | 1/2004 | Taguchi et al. ............. 503/227 |
| 6,998,213 B2 | * | 2/2006 | Aso et al. ................... 430/126 |
| 7,022,759 B2 | * | 4/2006 | Martin et al. ............... 524/513 |
| 2003/0050379 A1 | | 3/2003 | Shih et al. .................. 524/431 |

FOREIGN PATENT DOCUMENTS

| | | |
|---|---|---|
| EP | 1 162 229 | 6/2001 |
| EP | 1 177 913 | 7/2001 |
| JP | 02196848 A * | 8/1990 |
| WO | 02/38382 | 5/2002 |

OTHER PUBLICATIONS

Sperling, L.H.; Introduction to Physical Polymer Science 2nd Ed., John Wiley & Sons, Inc., New York, 1992 (pp. 13 and 99).*
"VITEL® Resins Technical Guide"—Bostik, 1997.
Bostik Findley Product Data—5833B, (NA).
Bostik "Product Information—VITEL® Copolyester Resins",(NA).
Bostik Brochure—pp. 22-25—"Copolymer Resins", (NA).
FineTone Product Line Comparison—Reichhold Chemicals, Inc, (NA).
Zelec ECP DuPont, (NA).
EP 04 75 3037; Supplementary European Search Report dated Sep. 19, 2006.

* cited by examiner

*Primary Examiner*—Callie Shosho
(74) *Attorney, Agent, or Firm*—Renner, Otto, Boisselle & Sklar

(57) ABSTRACT

This invention relates to ink-receptive coating compositions and to articles containing a layer formed from such coating compositions. In one embodiment, the articles comprise a polymer film substrate and an ink-receptive layer on the upper surface of the polymer film substrate. In another embodiment, the article also comprises an adhesive layer on the bottom surface of the polymer film substrate. The articles may have a print image on the upper surface of the ink-receptive layer, and such print images exhibit improved performance when exposed to extreme environments such as high temperatures, water, solvents and abrasion.

27 Claims, No Drawings

INK-RECEPTIVE COATINGS, COMPOSITES AND ADHESIVE-CONTAINING FACESTOCKS AND LABELS

REFERENCE TO RELATED APPLICATION

This application is a continuation-in-part of U.S. application Ser. No. 10/452,885 filed Jun. 2, 2003 now abandoned the written description and claims of which are hereby incorporated by reference in their entirety.

FIELD OF THE INVENTION

This invention relates to ink-receptive coating compositions and to articles containing a layer formed from such coating compositions. The invention also relates to the preparation of labels containing a layer formed from such ink-receptive coating compositions.

BACKGROUND OF THE INVENTION

It has long been known to manufacture and distribute adhesive stock for labels and signs by providing a layer of facestock material backed by a layer of adhesive which in turn is covered by a release liner or carrier. The release liner or carrier protects the adhesive during shipment and storage. The release liner or carrier also allows for efficient handling of an array of individual labels after the labels are die-cut and the matrix is stripped from the layer of facestock material, up to the point where the individual labels are dispensed in sequence on a labeling line. During the time from die-cutting to dispensing, the liner or carrier remains uncut and may be rolled and unrolled for storage, transit and deployment of the array of individual labels carried thereon.

It also is desirable that the face of the labels be ink printable with a variety of inks and using a variety of printing systems. It also is desirable that the printed label-stocks and ultimately the printed labels, provide clear and permanent images which are resistant to deterioration under various environmental conditions such as temperature, water, solvents, abrasion, scratching, etc.

SUMMARY OF THE EMBODIMENTS

In one embodiment, this invention relates to an ink-receptive coating composition comprising:
(A) from about 98 parts by weight to about 60 parts by weight of a polyester resin having an Mn greater than 12,000,
(B) from about 2 parts by weight to about 40 parts by weight of a polyester resin having an Mn in the range of from about 2,000 to 12,000, wherein said parts by weight are based on the total weight of the polyester resin in the composition, and
(C) at least one crosslinking agent.

In another embodiment, the invention relates to a composite article which comprises:
(A) a polymer film substrate having an upper surface and a lower surface, and
(B) an ink-receptive layer having an upper surface and a lower surface wherein the lower surface of the ink-receptive layer overlies the upper surface of the film substrate, and wherein the ink-receptive layer is formed from a coating composition comprising:
(B-1) from about 98 parts by weight to about 60 parts by weight of a polyester resin having an Mn greater than 12,000,
(B-2) from about 2 parts by weight to about 40 parts by weight of a polyester resin having an Mn in the range of from about 2,000 to 12,000 wherein said parts by weight are based on the total weight of the polyester resin,
(B-3) from 0 to about 10% by weight of a filler, based on the total weight of polyester resin in the composition,
(B-4) at least one crosslinking agent, and
(B-5) at least one organic solvent.

In yet another embodiment, the invention relates to an adhesive containing labelstock which comprises:
(A) a polymer film substrate having an upper surface and a lower surface, and
(B) an ink-receptive layer having an upper surface and a lower surface wherein the lower surface of the ink-receptive layer overlies the upper surface of the film substrate, and wherein the ink-receptive layer is formed from a coating composition comprising
(B-1) from about 98 parts by weight to about 60 parts by weight of a polyester resin having an Mn greater than 12,000,
(B-2) from about 2 parts by weight to about 40 parts by weight of a polyester resin having an Mn in the range of from about 2,000 to about 12,000 wherein said parts by weight are based on the total weight of the polyester resin,
(B-3) from 0 to about 10% by weight of a filler, based on the total weight of polyester and the resin in the composition,
(B-4) at least one crosslinking agent, and
(B-5) at least one organic solvent, and
(C) a layer of adhesive underlying the lower surface of the film substrate, said layer of adhesive having an upper surface and a lower surface.

In addition, the present invention relates to printed composite articles, printed adhesive containing labelstocks, and labels prepared from the adhesive-containing labelstocks and the adhesive-containing printed labelstocks.

DESCRIPTION OF THE INVENTION

The term "overlies" and cognate terms such as overlying and the like, when referring to the relationship of one or a first layer relative to another or a second layer, refers to the fact that the first layer partially or completely overlies the second layer. The first layer overlying the second layer may or may not be in contact with the second layer. For example, one or more additional layers may be positioned between the first and the second layer. The term "underlies" and cognate terms such as "underlying" and the like have similar meanings except that the first layer partially or completely lies under, rather than over the second layer.

The term "transparent" when referring to one or more layers of the label film means that any material beneath such layers can be seen through such layers. In reference to the use of "transparent" or "clear" labels applied to clear containers, such as clear glass or plastic bottles, the bottles and the contents of the bottle are visible through the label.

Coating Compositions

The ink-receptive coating compositions of the present invention comprise from about 98 parts by weight to about 60 parts by weight of a polyester resin having an Mn greater than 12,000. The polyester resins having an Mn of greater than 12,000 are sometimes referred to herein as high molecular weight polyester resins. The coating compositions also comprise from about 2 parts by weight to about 40 parts by weight of a polyester resin having an Mn in the range of from about 2,000 to about 12,000. The polyester resins having an Mn in the range of from about 2,000 to about 12,000 are sometimes referred to herein as low molecular weight polyester resins.

In another embodiment, the amount of the high molecular weight polyester resin contained in the coating composition may range from about 98 to about 70 parts by weight, or from about 98 parts to about 80 parts by weight. In yet another embodiment, the coating compositions may contain from about 98 to 90 parts by weight of the high molecular weight polyester resin.

The amount of the low molecular weight polyester resin contained in the coated composition may, in other embodiments, range from about 2 parts by weight to about 10, 20 or even 30 parts by weight. Throughout this written description and the appended claims, the parts by weight of the low molecular weight polyester resin and the high molecular weight polyester resin are based on the total weight of the polyester resin in the composition.

In other embodiments of the present invention, the high molecular weight polyester resin may have an Mn of from about 15,000 to about 40,000, and the low molecular weight polyester resin may have an Mn in the range of from about 3,000 to about 8,000 or from about 3,000 to about 5,000.

A variety of high molecular weight and low molecular weight polyester resins can be utilized in the coating compositions of the present invention. Throughout this written description and the appended claims, the term polyester includes copolyesters. The polyester resins generally are prepared from various glycols or polyols and one or more aliphatic or aromatic carboxylic acids. Examples of useful polyester resins include resins obtained by condensation polymerization of a diol having a bisphenol skeleton or alkylene skeleton with one or more divalent or trivalent carboxylic acid. In one embodiment, the bisphenol component may be modified with ethylene glycol or propylene glycol. Examples of suitable acid components for condensation with the polyols include fumaric acid, phthalic acid, terephthalic acid, isophthalic acid, maleic acid, succinic acid, adipic acid, citraconic acid, itaconic acid, sebacic acid, malonic acid, hexacarbonic acid and trimellitic acid.

In one embodiment, the polyester resins useful in the present invention may be characterized as aromatic polyester resins, saturated polyesters resins, and/or linear saturated polyesters or copolyesters. In one embodiment, the high molecular weight polyesters may be further characterized as having a hydroxyl number (mg KOH/g) of ten or less, and an acid number of less than 5. In one embodiment, the low molecular weight polyester resins useful in the present compositions, may be further characterized as being highly functional saturated polyester resins. In one embodiment, these highly functional saturated polyester resins may be characterized by having a hydroxyl number of greater than 20 and in other embodiments greater than 30 or 35 up to about 50 or more. The low molecular weight polyester resins also may be characterized as having an acid number of 5 or greater, in some embodiments, the acid number of the low molecular weight polyester resin is from about 10 to about 25.

The polyester resins useful in the present invention may be prepared by techniques well known to those skilled in the art. In addition, useful high molecular weight and low molecular weight resins are available commercially from a variety of sources. A variety of high molecular weight polyester resins are available commercially from Bostik Findley under the general trade designation Vitel® which are identified as linear saturated copolyesters. Useful low molecular weight polyester resins are available from Reichhold Chemicals Inc. under the general trade designation FineTone™, and from Bostik Findley under the general trade designation Vitel 5833B. Specific examples of useful low molecular weight polyester resins available from Reichhold Chemicals include: FineTone 382-ES identified as a bisphenol-A fumarate polyester; 382 ES-HMW identified as a higher molecular weight version of FineTone 382 ES; FineTone 6694 identified as a modified bisphenol A polyester; and FineTone PL-100 identified as a non bisphenol A polyester.

Characteristics of some of the commercially available high molecular weight polyester resins are summarized below in Table I, and the characteristics of the low molecular weight polyester resins are summarized in Table II.

TABLE I

High Molecular Weight Polyester Resin

| Name | Mn | Hydroxyl Number | Acid Number |
|---|---|---|---|
| Vitel 2200 | 24,500 | 1-3 | 3-5 |
| Vitel 2300 | 24,500 | 1-3 | 3-5 |
| Vitel 2700 | 28,000 | 1-2 | 2-5 |
| Vitel 7922 | 19,000 | 0-2 | 3-9 |

TABLE II

Low Molecular Weight Polyester Resin

| Name | Mn | Hydroxyl Number | Acid Number |
|---|---|---|---|
| Vitel 5833B | 4600 | 36.5-55.5 | 65 |
| FineTone 382 ES | 4760 | 39 | 21 |
| FineTone 382 ES-HMW | 7260 | 23 | 18 |
| FineTone 6694 | 4060 | 37 | 13 |
| FineTone PL-100 | 3900 | 43 | 5 |

The coating compositions of the present invention also comprise at least one crosslinking agent which may be present in an amount which is effective for crosslinking the mixture of high molecular weight and low molecular weight polyester resin contained in the coating composition. In one embodiment, the amount of crosslinking agent(s) may vary from about 0.01% to about 20%, or from about 0.3% to about 10%, or from about 0.5% to about 5% by weight based on the total weight of polyester resins in the coating composition. The crosslinking agents may be any of those known to those skilled in the art for crosslinking polyester resins. The crosslinking agents may be organic or inorganic. In one embodiment, the crosslinking agents are organic materials including epoxy compounds, polyaziridines, melamines, oxazolines, triazines, polyisocyanates, polyfunctional carbodiimides, etc. Examples of inorganic crosslinking agents which may be utilized include zinc ammonium carbonate, zirconium carbonate, etc.

A variety of epoxy compounds (oxiranes) are useful as crosslinking agents. Examples include, but are not limited to epoxy modified bisphenol A and epichlorohydrin epoxy resins.

Polyaziridines are derived from aziridines which are trifunctional amine compounds which may be derived from ethyleneimine. An example of a useful commercially available polyaziridine is NeoCryl CX 100 available from Avecia Resins, and this crosslinking agent is identified as trimethylol-tris N(methylaziridinyl))proprionate. Another commercially available polyfunctional aziridine is XAMA-7 available from Bayer. An example of a commercially available carbodimide crosslinking agent is UCARLINK XL-29SE available from Dow Chemical.

Aliphatic and aromatic polyisocyanates may be used as crosslinking agents in the coating compositions. Any of the known polyisocyanate crosslinking agents may be used. A number of crosslinking agents are available from Bayer (Pittsburgh, Pa.) under the general trade designation Desmodur®. For example, Desmodur N 3300 is an aliphatic hexamethylene diisocyanate, and Desmodur CB-75N is an oligomeric toluene diisocyanate.

Melamine formaldehyde resins are also useful crosslinking agents. An example of a commercially available melamine formaldehyde is Cymel 303 from Cytec.

Improved results such as improved adhesion to some polymer film substrates, improved printability and/or improved abrasion resistance exhibited by the coatings of the invention are obtained in some embodiments when the coating compositions contain at least two crosslinking agents. Thus, for example, improved adhesion and abrasion resistance are obtained when the coating composition contain a polyisocyanate crosslinking agent and a polyaziridine crosslinking agent. The improvement in adhesion when two or more crosslinking agents are incorporated into the coating compositions as particularly evident when the coating compositions are applied to substrates which are generally difficult to coat such as propylene polymer and copolymer substrates. In another embodiment, improved printability is observed.

The coating compositions of the present invention generally also comprise at least one organic solvent to dissolve the polyester resins and crosslinking agent(s). The solvents may comprise aliphatic ketones, aromatic hydrocarbons, cyclic ketones, etc., and mixtures thereof. Specific examples of useful organic solvents include methyl ethyl ketone, toluene, cyclohexanone, and mixtures of two or more of these solvents. In one embodiment, a solvent mixture comprising 10-15% by weight of methylethyl ketone, about 45-60% by weight toluene and about 3-10% by weight of cyclohexanone is useful in forming the coating compositions of the present invention. The total amount of organic solvent included in the coating compositions is an amount which is at least sufficient to dissolve the resins and other soluble components of the coating compositions. In one embodiment, the coating compositions contain from about 50% to about 80% by weight of organic solvent.

The coating compositions of the present invention also may, in some embodiments, contain one or more fillers. The amount of filler included may range from about 0 to about 10% by weight, based on the total weight of the polyester resin in the composition. In another embodiment the amount of filler is from 0.1 to about 10% by weight. In other embodiments, when a filler is included, it generally is included in smaller amounts such as in the range of from about 0.01% to about 3% or 5% by weight. Either organic fillers or inorganic fillers can be utilized. Examples of inorganic fillers which can be utilized include silica, colloidal silica, alumina, aluminum hydroxide, kaolin, clay, calcium carbonate, talc, titanium dioxide, etc. Commercial examples of useful fillers include Syloid 244, a synthetic amorphous silica from Grace Davidson (Columbia, Md.); Gasil 23F, a synthetic amorphous silicon dioxide from Crosfield Chemicals (Joliet, Ill.), and Hydral 710, an aluminum hydroxide from Alcoa.

The type and amount of filler including in the coating composition will depend in part upon the type of ink-receptive coating desired, and whether a transparent or opaque coating is desired. In one embodiment, the amount of filler or fillers included in the coating compositions may exceed 10% by weight when it is desired to have an opaque or hazy coating on a label to match a substrate on which the label is placed. For example, when a label is to be used on a frost bottle such as a frost wine bottle, the coating composition may contain up to about 75% by weight of one or more fillers, based on the total weight of polyesters. Example C below is an example of a composition usable on a label for a frost wine bottle and the composition contains about 65% by weight of aluminum hydroxide and about 2.2% of silica based on the total weight of polyester in the coating composition.

Electroconductive fillers may also be included in the coating compositions when, for example, a conductive or static dissipating coating is desired. In such embodiment the amount of electroconductive filler may be as high as about 50% or even 60% by weight, based on the total weight of polyester in the coating composition. In another embodiment, the amount of electroconductive powder will be in the range of 40% to about 50% by weight, based on the total weight of polyester in the coating composition. Any known electroconductive powders may be used. In one embodiment, the electroconductive powders may be antimony-doped tin oxides available from DuPont under the general designation Zelec®. One type consists of a dense layer of crystallite of antimony-doped tin oxide on an inert core particle of titanium dioxide, mica or silica. The second type consists of antimony-doped tin oxide without the core, thus providing smaller conductive powders which can be used in formulations where both transparency and conductivity of the dry coating are desired. Specific examples of useful electroconductive powders include Zelec ECM-1410M which has a mica core and can be used to prepare clear dry coatings; Zelec ECP-2703-S which has a hollow silica shell and is useful in preparing matte coatings; Zelec ECP-1410-T which has a titanium dioxide core; and Zelec ECP-3010-XC which has no core.

The following examples illustrate the coating compositions of the present invention. Unless otherwise indicated in the following examples, and elsewhere in the written description and claims, all parts and percentages are by weight, temperatures are in degrees centigrade, and pressure is at or near atmospheric pressure.

|  | Parts by Weight |
|---|---|
| Example A | |
| Methylethyl ketone | 10.40 |
| Toluene | 41.60 |
| Cyclohexanone | 15.00 |
| Vitel 2200 | 31.34 |
| FineTone 382 ES | 1.66 |
| Desmodur CB 75N | 3.53 |
| Example B | |
| Methylethyl ketone | 23.06 |
| Toluene | 53.72 |
| Cyclohexanone | 5.0 |
| Vitel 2200 | 21.96 |
| FineTone 382 ES | 1.16 |
| Syloid 234 | 0.10 |
| Neocryl CX-100 | 0.50 |

-continued

| | Parts by Weight |
|---|---|
| Example C | |
| Methylethyl ketone | 12.80 |
| Toluene | 41.20 |
| Cyclohexanone | 5.00 |
| Vitel 2200 | 16.63 |
| FineTone 382 ES | 1.85 |
| Hydral 710 | 12.0 |
| Silica TS-100 | 0.52 |
| Neocryl CX 100 | 2.2 |
| Example D | |
| Methylethyl ketone | 20.00 |
| Toluene | 51.29 |
| Cyclohexanone | 5.00 |
| Vitel 2200 | 20.89 |
| FineTone 382 ES | 2.32 |
| Syloid 234 | 0.50 |
| CX 100 | 0.91 |
| Example E | |
| Methylethyl ketone | 23.0 |
| Toluene | 53.72 |
| Cyclohexanone | 5.00 |
| Vitel 2200 | 14.64 |
| FineTone 382 ES | 0.77 |
| Zelec ECM-1410M | 7.81 |
| Desmodur CB-75N | 0.49 |

TABLE III

Examples F-N (pbw)

| | F | G | H | I | J | K | L | M | N |
|---|---|---|---|---|---|---|---|---|---|
| Methylethyl ketone | 14.0 | 14.0 | 14.0 | 14.0 | 14.0 | 14.0 | 14.0 | 14.0 | 14.0 |
| Toluene | 56.0 | 56.0 | 56.0 | 56.0 | 56.0 | 56.0 | 56.0 | 56.0 | 56.0 |
| Cyclohexanone | 5.0 | 5.0 | 5.0 | 5.0 | 5.0 | 5.0 | 5.0 | 5.0 | 5.0 |
| Vitel 2200 | 23.27 | 23.27 | 22.05 | 20.89 | 23.27 | 22.05 | 23.27 | 23.27 | 23.27 |
| FineTone 382 ES | 1.23 | 1.23 | — | 2.32 | 1.23 | 2.45 | 1.23 | 1.27 | 1.27 |
| Vitel 5833 B | — | — | 2.45 | — | — | — | — | — | — |
| Syloid 234 | 0.5 | — | — | — | 0.5 | 0.5 | — | — | — |
| Desmodur CB 75 N | 2.3 | 2.3 | 2.3 | 2.3 | — | — | 1.0 | 2.0 | 3.0 |
| CX-100 | — | — | — | — | 0.53 | 0.97 | — | — | — |

TABLE IV

Examples O-Q

| | O | P | Q |
|---|---|---|---|
| Methylethyl ketone | 23.06 | 23.06 | 23.06 |
| Toluene | 53.72 | 53.72 | 53.72 |
| Vitel 2200 | 21.96 | 21.96 | 21.96 |
| FineTone 382 ES | 1.16 | 1.16 | 1.16 |
| Syloid 234 | 0.10 | 0.10 | 0.10 |
| Desmodur CB-75N | 2.00 | 2.00 | 2.00 |
| CX 100 | 0.12 | 0.25 | 0.50 |

Composite Articles

The coating compositions of the present invention are useful in preparing composite articles which comprise (A) a polymer film substrate having an upper surface and a lower surface, and (B) an ink-receptive layer having an upper surface and a lower surface wherein the lower surface of the ink-receptive layer overlies the upper surface of the film substrate, and the ink-receptive layer is formed from the coating compositions of the present invention which are described in detail above.

The polymer film substrate may be a monolayer film or a multilayer film. The multilayer film may comprise from two to ten or more layers. The polymer film substrate may be oriented or not oriented. Depending on the end use of the label, the polymer film substrate may be transparent or opaque. Opaque film substrates generally comprise a polymer as described below and one or more pigments to provide the film substrate, or one layer of a multilayer film substrate with the desired color. Pigments useful for this purpose are well known in the art. For example, white films can be prepared by introducing titanium dioxide and other white pigments into the polymer. Carbon black may be introduced to provide a black or grey film substrate or film.

A wide variety of polymer film materials are useful in preparing the film substrates useful in the present invention. For example, the polymer film material may include polymers and copolymers such as at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of ethylene methacrylic acid, cellulosics, polyacrylonitrile, alkylene-vinyl acetate copolymer, or mixtures of two or more thereof.

The polyolefins which can be utilized as the polymer film material include polymers and copolymers of olefin monomers containing 2 to about 12 carbon atoms such as ethylene, propylene, 1-butene, etc., or blends of mixtures of such polymers and copolymers. In one embodiment the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content. Useful propylene homopolymers and copolymers are described in U.S. Pat.

No. 5,709,937 (Adams et al). The copolymers include propylene-ethylene copolymers containing up to about 10% by weight of ethylene, and propylene-1-butene copolymers containing up to about 15% by weight of 1-butene. Oriented films described in the '937 patent are clear films useful as the film substrate in the labels of the present invention. The disclosure of U.S. Pat. No. 5,709,937 is hereby incorporated by reference.

Various polyethylenes can be utilized as the polymer film material including low, medium, and high density polyethylenes, and mixtures thereof. An example of a useful low density polyethylene (LDPE) is Rexene 1017 available from Huntsman. An example of a useful high density polyethylene (HDPE) is Formoline LH5206 available from Formosa Plastics. In one embodiment the polymer film material comprises a blend of 80 to 90% HDPE and 10-20% of LDPE.

The propylene homopolymers which can be utilized as the polymer film material in the invention, either alone, or in combination with a propylene copolymer as described herein, include a variety of propylene homopolymers such as those having melt flow rates (MFR) from about 0.5 to about 20 as determined by ASTM Test D 1238. In one embodiment, propylene homopolymers having MFR's of less than 10, and more often from about 4 to about 10 are particularly useful. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Dow Chemical and having a melt flow of 12.0 g/10 min and a density of 0.90 g/cm$^3$; DX5E66, also available from Dow Chemical and having an MFI of 8.8 g/10 min and a density of 0.90 g/cm$^3$; and WRD5-1057 from Dow Chemical having an MFI of 3.9 g/10 min and a density of 0.90 g/cm$^3$. Useful commercial propylene homopolymers are also available from Fina and Montel.

Examples of useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, International Paper of Wayne, N.J. under the Uni-Rez product line, and dimer-based polyamide resins available from Bostik, International Paper, Fuller, Henkel (under the Versamid product line). Other suitable polyamides include those produced by condensing dimerized vegetable acids with hexamethylene diamine. Examples of polyamides available from International Paper include Uni-Rez 2665; Uni-Rez 2620; Uni-Rez 2623; and Uni-Rez 2695.

Polystyrenes can also be utilized as the polymer film substrate material and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymer film material, and the polyurethanes may include aliphatic as well as aromatic polyurethanes.

The polyurethanes are typically the reaction products of (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, and Sancure 12471® (all of which are commercially available from Noveon, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia), and NeoRez R-960 (Avecia).

Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the film substrates comprises at least one polyester polyurethane. Examples of these urethanes include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company Avecia, and the acrylic copolymer dispersion sold under the name "Neocryl XK-90" by the company Avecia.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical.

Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid, etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In one embodiment, the film substrate polymer material may comprise fluorinated polymer. The fluorinated polymer includes a thermoplastic fluorocarbon such as polyvinylidene fluoride (PVDF). The fluorinated polymer also can include copolymers and terpolymers of vinylidene fluoride. A useful thermoplastic fluorocarbon is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The polymer film substrate material may be free of inorganic fillers and/or pigments for clear film substrates and clear labels, or the polymer film substrate material may be cavitated and/or contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, etc. Other materials may be included in the film substrate including flame retardants, antioxidant compounds, heat stabilizers, light stabilizers, ultraviolet light stabilizers, antiblocking agents, processing aids, acid acceptors, etc.

The polymer film substrate material is chosen to provide a continuous polymer film in the film structures of this invention with the desired properties such as improved tensile strength, elongation, impact strength, tear resistance, and optics (haze and gloss). The choice of polymeric film substrate forming material also is determined by the desired physical properties such as melt viscosity, high speed tensile strength, percent elongation etc. In one embodiment, clear or transparent film substrates are used in the label construction when clear or transparent labels are desired.

The thickness of the polymer film substrate is from about 0.1 to about 10 mils, or from about 1 to about 5 mils. In one embodiment the thickness of the film substrate is from about 1 to about 3 mils. The film substrate may comprise a single layer, or the film can be a multilayer film of two or more adjacent layers. For example the film can comprise one layer of a polyolefin and one layer of a blend of a polyolefin and a copolymer of ethylene and vinyl acetate (EVA). In another embodiment the film comprises three layers, a base or core layer of, for example, a polyolefin, and skin layers in both sides of the base or core layer which may be comprised of the same or different polymer blends. The individual layers of a multilayer film substrate may be selected to provide desirable properties.

The monolayer and multilayer film substrates useful herein can be manufactured by those processes known to those skilled in the art such as by casting or extrusion. In one embodiment, the films are manufactured by polymer extrusion or coextrusion processes. The extrudate or coextrudate of polymeric film materials is formed by simultaneous extrusion from a suitable known type of extrusion or coextrusion die, and in the case of a coextrudate, the layers are adhered to each other in a permanently combined state to provide a unitary coextrudate.

In addition to coextrusion, the multilayer film substrates useful in the present invention may be prepared by extrusion of a continuous film to form one layer followed by the application of one or more additional layers on the extruded layer by extrusion of one or more additional layers; by lamination of a preformed polymer film to a preformed functional film; or by deposition of additional layers on the preformed film from an emulsion or solution of a polymeric film forming material.

In one embodiment, the film substrates used in the present invention are not oriented. That is, the film substrate and films are not subjected to a hot-stretching and annealing step. In other embodiments, the film substrate contained in the labels used in the present invention may be oriented in the machine direction (uniaxially) or in both the machine and cross directions (biaxially) by hot-stretching and annealing by techniques well known to those skilled in the art. For example, the films may be hot-stretched in the machine direction only at a ratio of at least 2:1 and more often, at a ratio of between about 2:1 to about 9:1. After the film has been hot stretched, it is generally passed over annealing rolls where the film is annealed or heat-set at temperatures in the range of from about 50° C., more often 100° C. to about 150° C., followed by cooling. In another embodiment, the film substrate is a biaxially oriented. In one embodiment, it is desirable that the film substrates exhibit a degree of stiffness in the machine direction and the cross direction to facilitate handling, printing and dispensing. Thus, in one embodiment, the stiffness of the film substrate in the machine direction and the cross direction should be at least about 14 Gurley (mg), as determined using TAPPI Test T543 pm. In a further embodiment, the Gurley stiffnesses in both directions are within about 5 Gurley units (sometimes referred to as a balanced stiffness).

Polymer film substrates useful in the labels of the present invention are available commercially from a variety of sources such as Avery Dennison Corp., Painesville, Ohio; AMTOPP, a division of Interplast Group LTD, Livingston, N.J. 07039, Exxon Mobil Chemical Co., Macdon, N.Y. 14502; AET Films, New Castle, Del. 19720; and UCB Films Inc., Smyrna, Ga. 30080. Clear films and white films are available.

Specific examples of useful polypropylene film substrate films which are commercially available include the following:

| Film Name | Thickness (mils) | Type | Gurley Stiffness (mg) MD | Gurley Stiffness (mg) CD |
| --- | --- | --- | --- | --- |
| Mobil BOPP W/434TC | 2 | Clear | 15 | 18 |
| AMTOPP BOPP | 2 | Clear | 16 | 17 |
| UCB CA-200 BOPP | 2 | Clear | 25 | 28 |
| AET CSL 111-125 C/S | 3.2 | White | 48 | 71 |

The surface energy of one or both surfaces of the film substrate can be enhanced by treatments such as corona discharge, flame, plasma, etc. to provide the surfaces with desirable properties such as improved adhesion to subsequently applied layers. Procedures for corona treating and flame treating of polymer films are well known to those skilled in the art.

The composite articles comprising the polymer film substrate and the ink-receptive layer can be prepared by applying the ink-receptive coating compositions described above to one or both surfaces of a film substrate (or a labelstock which includes an adhesive layer) using a conventional coating or other application technique, and then drying the coating at room temperature or elevated temperature in an oven to remove the solvents and to effect and complete crosslinking of the polyester resins. Nonlimiting examples of coating techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. For label products, the coating compositions can be applied to the film substrate using any conventional technique or process, including without limitation, coating "on press" during the converting process (e.g., in concert with the processes of die-cutting, matrix stripping, etc.), coating off-press using a separate coater, and other application methods.

The coating compositions of the present invention can be applied to the film substrate at room temperature or at elevated temperatures, and the coated film substrates may be subjected to higher temperatures to accelerate evaporation of the solvents and crosslinking. In one embodiment, the elevated temperature used to dry and cure the coating is dependent upon the nature and properties of the film substrate. Thus, for polypropylene film substrates, the elevated temperature should not exceed around 95° C. (200° F.) and for polyester film substrates, the temperatures should not exceed about 150° C. (300° F.).

In general, the dry coat weights of the ink-receptive layer may range from about 1 to about 10 or even 20 or more gsm (g/m$^2$). In other embodiments, the dry coat weight may range from about 1 to about 7 gsm, and in yet a further embodiment, the dry coat weight may range from about 1 to about 5.5 gsm. In some embodiments, coating weights of from about 1 to about 3 or 3.5 gsm provide desirable results with respect to adhesion and abrasion resistance of the coating when the coating composition comprises two or more crosslinking agents. In one embodiment improved adhesion and abrasion resistance are obtained when the coating composition comprises at least one polyisocyanate crosslinking agent and a polyaziridine crosslinking agent. In other embodiments, dry coat weights of at least 3.5, and more often dry weights of at least 4.5 or at least 5 gsm are utilized to provide improved scratch and abrasion resistance as well as improved print quality when the ink-receptive layer is printed.

The following examples illustrate composite articles of the present invention which comprise a polymer film substrate having an ink-receptive layer.

EXAMPLE 1

A 2 mil PET film is coated with the coating composition of Example A utilizing a gravure cylinder coater at a line speed of 200-250 feet per minute. After drying/curing, the dry coat weight of the coating on the PET film is about 5 gsm.

EXAMPLE 2

A 2 mil clear BOPP film is coated with the coating composition of Example B using a gravure cylinder at a line speed of 400-500 feet per minute. Dry coat weights ranging from 0.8 to about 2.0 gsm are obtained.

EXAMPLE 3

The procedure of Example 2 is repeated except that the film substrate is a white BOPP.

EXAMPLE 4

A 2 mil clear BOPP film is coated with the coating composition of Example C using a gravure cylinder at a line speed of 300-400 feet per minute. The dry coat weight is about 3 gsm.

EXAMPLE 5

A 200 gauge clear PET film is coated with the coating composition of Example D using a gravure cylinder at a line speed of 200-400 fpm. After drying and curing, the dry coat weight is about 3 gsm.

EXAMPLE 6

The procedure of Example 2 is repeated except that the film substrate is a corona treated 2.6 mil FasClear film from Avery Dennison.

EXAMPLE 7

A 2 mil PET film is coated with the composition of Example E utilizing a gravure cylinder coater at a line speed of from 200-300 feet per minute. Dry coat weights ranging from about 2 to about 4 gsm are obtained.

EXAMPLES 8-23

Samples of a 2 mil PET film are coated with some of the coating compositions identified in Table III utilizing a gravure cylinder coater. After drying and curing, the coat weight is determined. The details of these Examples are summarized in Table V.

TABLE V

| | Composite Examples | |
|---|---|---|
| Example | Coating Composition Example | Dry Coat Weight (gsm) |
| 8 | F | 3.75 |
| 9 | F | 5.73 |
| 10 | G | 3.68 |
| 11 | G | 5.73 |
| 12 | H | ~6 |
| 13 | H | ~4 |
| 14 | I | ~4 |
| 15 | I | ~6 |
| 19 | N | 4.17 |
| 20 | N | 3.91 |
| 21 | N | 3.60 |
| 22 | N | 2.73 |
| 23 | N | 2.45 |

EXAMPLES 24-29

Samples of Crystal FasClear 250 from Avery Dennison are coated with the coating compositions of Examples O-Q, air dried for 5 minutes and cured in an oven at 75° C. (200° F.) for a period of time as indicated in the following Table VI. The dry coating weight in each example is about 1 gsm. All samples exhibit 100% adhesion after 24 hours.

TABLE VI

Composite Examples

| Example | Coating Composition Example | Bake Time (secs) |
|---------|------------------------------|------------------|
| 24 | O | 30 |
| 25 | O | 45 |
| 26 | P | 30 |
| 27 | P | 45 |
| 28 | Q | 15 |
| 29 | Q | 30 |

As noted above the coating compositions of the invention such as illustrated in Examples 1-29 readily accept ink and provide clear and lasting images. Thus, in one embodiment, the composites described above containing a layer of the ink receptive compositions of the invention are readily printed by a variety of processes. Coatings in accordance with this invention may be designed for improved performance in certain printing systems. For example, the coatings of the composite of Examples 1-4 and 6-7 are readily printable using a thermal ink transfer process; the coatings of Examples 2-4 also are readily printable in a UV flexo process; the coating of Examples 2 and 3 also are printable issuing a UV letter press; and the coating of Example 5 is printable using high speed laser printers.

Adhesive Labelstocks

As mentioned above, the present invention also relates to adhesive containing labelstocks for use in preparing adhesive labels. The adhesive containing labelstocks comprise:

(A) a polymer film substrate having an upper surface and a lower surface, (B) an ink-receptive layer having an upper surface and a lower surface wherein the lower surface of the ink-receptive layer overlies the upper surface of the film substrate, and wherein the ink-receptive layer is formed from the coating compositions of the present invention described above, and (C) a layer of adhesive underlying the lower surface of the film substrate, said layer of adhesive having an upper surface and a lower surface.

The adhesive layer may be directly coated on the lower surface of the film substrate, or the adhesive layer may be transferred from a liner with which the film substrate is combined. Alternatively, a composite of the film substrate and adhesive layer can be formed by coextrusion of the film substrate film and the adhesive.

Typically, the adhesive layer has a thickness in the range of from about 0.1 to about 2 mils (2.5 to 50 microns). Adhesives suitable for use in the adhesive composites and labelstocks of the present invention are commonly available in the art. Generally, these adhesives include pressure-sensitive adhesives, heat-activated adhesives, hot melt adhesives, and the like. Pressure-sensitive adhesives are particularly useful. These include acrylic based adhesives as well as other elastomers such as natural rubber or synthetic rubbers containing polymers or copolymers of styrene, butadiene, acrylonitrile, isoprene and isobutylene. Pressure-sensitive adhesives are well known in the art and any of the known adhesives can be used with the film substrates of the present invention. In one embodiment, the pressure-sensitive adhesives are based on copolymers of acrylic acid esters, such as, for example, 2-ethyl hexyl acrylate, with polar comonomers such as acrylic acid.

In the manufacture of labelstock from the above-described multilayer film substrates in accordance with the invention, liner or carrier stock may be provided. The liner or carrier stock may comprise a multilayer liner made for example as disclosed in U.S. Pat. No. 4,713,273, the disclosure which is incorporated herein by reference, or may be a conventional liner or carrier consisting of a single paper of film layer which may be supplied in roll form. If it has not been previously provided with a release coating and does not itself include components to inherently generate a release surface at its adhesive-contacting face, the liner or carrier may be coated with a release coating (e.g., a silicone). If a release coating is applied, it is dried or cured following application by any suitable means.

The release face of the release liner or carrier may be coated with a layer of pressure-sensitive adhesive for subsequent transfer of the adhesive to the film substrate with which the liner or carrier is employed. When the film substrate is combined with the liner or carrier, the adhesive is joined to the film substrate. Later, the liner or carrier is removed to expose the adhesive, and the adhesive remains permanently joined to the film substrate.

In some applications, the adhesive layer may be a heat-activated adhesive or a hot-melt adhesive such as used in in-mold label applications, as distinguished from a pressure-sensitive adhesive. If the adhesive is a heat-activated adhesive or a hot-melt adhesive, there may be no need for a release liner for inherent releasability such as is required when using a pressure-sensitive adhesive.

The present invention also relates to printed composite articles and printed adhesive labelstocks, both of which contain a print image on the upper surface of the ink-receptive layers described above. Examples of print images include data or pictorial designs such as variable imprinted data such as serial numbers, bar codes, trademarks, etc. High quality printed constructions are prepared by running the constructions through a printer and printing an image on the ink-receptive layer. A variety of printer technologies can be utilized including, without limitation, flexo/water based inks, UV letter press, UV flexo, UV silk screen, UV flatbed screen, piezo-electric printer heads, thermal ink transfer, laser, etc. The composites and film substrates of the present invention provide improved printability using, for example, a thermal ink transfer process, when the dry coat weight of the ink-receptive layer is at least 4 or at least 5 gsm. In the thermal ink transfer process, printing of the ink-receptive layer is accomplished by use of thermal ink transfer ribbon which, by application of heat and pressure by a print head, selectively transfers ink from the thermal ink ribbon directly to the ink-receptive layer.

In one embodiment, the coating compositions deposit coatings which can be printed on a UV flatbed screen with the total ink deposition reaching about 80 microns on a Kamman press. The inks may be applied at about 15 to 20 microns per station.

The labelstocks of the present invention may be printed at a printing station prior to being die-cut into individual labels. The printing step may occur before or after combining the liner and film substrate, but the printing generally will precede the die-cutting of the film substrate into individual labels. The film must remain in accurate register between the printing steps (for example, between the successive impressions of different colors) in order that the image or text can be of high quality, and between printing and subsequent die-cutting in order that the image or text be properly located on the labels. The film is maintained under tension during printing, and may be subjected to some increase in temperature as, for example, when UV inks are cured. The film must maintain dimensional stability in the machine direction.

In some embodiments, the printed composites and labelstocks of the present invention may be die-cut into labels, and in some embodiments, the printed composites and printed labelstocks of the present invention are die-cuttable into a series of spaced pressure sensitive labels carried by the release liner. The die-cutting step may be performed by rotary cutting dies in the well known manner and involves the subsequent stripping of the ladder-shaped matrix ("matrix stripping)" of waste or trim surrounding the formed labels when they are die-cut (the "rungs" of the ladder representing the spacing between successive labels). The labels then remain on the liner in spaced relation with each other. One failure mode in this operation involves poorly die-cut labels remaining with the matrix as it is stripped. In this mode, as release levels decrease, poor-die cutting is more likely to cause labels to stay attached to the matrix material and be removed from the liner during matrix stripping along with the matrix.

The printed composites, printed adhesive-containing labelstocks and labels described above, and in particular, the ink image contained thereon exhibit desirable properties such as improved temperature resistance, improved solvent resistance, improved abrasion resistance, improved scratch resistance, improved water resistance, etc. In one embodiment, these desirable properties are obtained without adding a transparent protective topcoat over the print image as required for many known printed labelstocks and labels. Thus the printed labelstocks and printed labels of the present invention can be prepared at lower cost than those requiring a protective topcoat.

The abrasion resistance of the printed composites and labels of the present invention is determined using the Taber abraser as set forth in ASTM D-4060. Test samples are prepared by laminating an adhesive layer (with release liner) to the lower surface of the polymer film substrate of the composites of the invention, and thereafter printing the upper surface of the ink-receptive layer of the composite of the present invention utilizing a Zebra 105 thermal transfer printer with a Sony 5070 Resin Ribbon. The ink is transferred to the coating of the test sample by heat and pressure. The test image is a combination of text and a bar code (no graphics). The release liner is removed and the adhesive containing composite is then adhered to a paper Taber card to form the test sample. The Taber machine is calibrated and the samples are then subjected to the Taber Test using a CS-10 Taber wheel and a 500 gram load. The number of cycles required for loss of scannability and/or loss of legibility of the image is determined. In this test, a cycle comprises one rotation of the wheel. The test is continued until there is a loss of legibility (visual determination) or loss of bar code scannability using a RJS Bar Scanner. The number of cycles to reach such loss is recorded.

In one embodiment, the ink receptive coatings of the composites of the invention are abrasion resistant. When subjected to the above described Taber test, printed coatings, in one embodiment will remain legible and be bar scannable after 80 test cycles or even 100 test cycles. In another embodiment, the printed coatings remain legible and bar scannable after 120 or even 140 test cycles.

The results of the Taber Abrasion Test on printed composites of this invention are summarized in the following table VII.

TABLE VII

Abrasion Test Results

| Printed Sample From Example | Loss of Scannability (Cycles) | Loss of Legibility (Cycles) |
| --- | --- | --- |
| 8 | 150 | 160 |
| 9 | 150 | 160 |
| 10 | 130 | 130 |
| 11 | 180 | 180 |
| 12 | 120 | 130 |
| 13 | 180 | 220 |
| 14 | 130 | 150 |
| 15 | 140 | 200 |
| 19 | 150 | 140 |
| 20 | 130 | 130 |
| 21 | 100 | 90 |
| 22 | 110 | 100 |
| 23 | 90 | 80 |

Labels which are prepared from the adhesive-containing labelstocks of the invention are useful in a variety of applications, particularly in applications requiring the label and the print image to be resistant to drastic or extreme environmental conditions such as labels used on automobiles and aircrafts, and on service parts, part components and code labels for the industrial, automotive, aircraft and electronics industries. For example, when the labels of the present invention are for use under the hood of automobiles, the various oils, greases, gasolines, brake fluids, wiper solvents, anti-freezes, etc., commonly encountered under the hood of an automobile are detrimental to labels. Printed labels of the present invention as described above, without an optional transparent polymer protective topcoat, have been found to be useful in under hood applications where labels are expected to withstand such greases and liquids. For example, test samples prepared as described above with the composite of Example 1, and aged for 72 hours at 22° C.±2° C. at 50% relative humidity, pass the requirements of General Motors Test Specification GM 6121 M-B, and the Taber Abrasion Test requirements of Daimler Chrysler Specification MS-CG121 Type D (change E2202-07-25). In addition, a composite (label) of Example 1, adhered to painted metal, passes the remaining requirements of the above Daimler Chrysler Specification.

In one embodiment, the printed labels prepared in accordance with the present invention also satisfy the requirements of the Fluid Immersion Test of GM 6121 MB specification of General Motors. In the immersion test, the printed labels are subjected to immersion in engine oil for 4 hours at 120° C.; engine coolant for 4 hours at 95° C.; windshield washer solvent for 4 hours at room temperature; a wetting agent for 4 hours at 95° C.; brake fluid for 4 hours at room temperature; and engine shampoo for 20 minutes at room temperature. At the end of these immersion tests, the label should not exhibit any blistering or impairment of legibility, nor should there be any visible loss of adhesion. Edge penetration up to 5.0 mm is disregarded in this test.

Composites, adhesive labelstocks and adhesive labels prepared in accordance with Example 7 using the coating formulation of Example E exhibit electroconductive and static dissipating properties. In particular, a coating of the composite prepared as in Example 7 is found to have an electrical resistivity of from $10^7$ to $10^8$ ohms as measured with an Autoranging. Resistance Indicator, Model 880, produced by Electo-Tech Systems, Inc.

Although not necessary, in some applications, it may be desirable to apply a transparent protective topcoat or overcoat layer over the print image to provide additional protection for the image. However, as noted above, one of the advantages of the ink-receptive layer utilized in the composites and labelstocks of the present invention is that the print image which is deposited thereon exhibits desirable properties such as temperature, solvent and abrasion resistance without the need of a protective topcoat.

The protective topcoat or overcoat layer provides desirable properties to the label before and after the label is affixed to a substrate such as a container. The presence of a transparent topcoat layer over the print layer may, in some embodiments provide additional properties such as antistatic properties stiffness and/or weatherability, and the topcoat may provide additional protection to the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g, UV), chemically resistant, thermally resistant thereby protecting the label and, particularly the print layer from degradation from such causes. The protective overcoat may also contain antistatic agents, or anti-block agents to provide for easier handling when the labels are being applied to containers at high speeds. The protective topcoat constructions of the labels used in the invention may also be selected to provide labels useful on containers subjected to subsequent liquid processing such as bottle washing/rinsing, filling and pasteurization, or liquid immersion (e.g., ice bath) without displaying adverse consequences such as label lifting or hazing. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 0.5 to about 5 mils, and in one embodiment about 1 to about 3 mils. Examples of the topcoat layers are described in U.S. Pat. No. 6,106,982 which is incorporated herein by reference.

The protective layer may comprise polyolefins, thermoplastic polymers of ethylene and propylene, polyesters, polyurethanes, polyacryls, polymethacryls, vinyl acetate homopolymers, co- or terpolymers, ionomers, and mixtures thereof. Any of the binders described above as being present in the nano-porous layer can be utilized in the protective topcoat layer.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidinethanol); Tinuvin 770 (bis-(2,2,6,6-tetramethyl-4-piperidinyl)-sebacate); and Tinuvin 783. Also useful light stabilizers are the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

The transparent protective layer may contain a metal deactivator. Any metal deactivator useful in making thermoplastic films can be used. These include the hindered phenol metal deactivators. Examples include those available from Ciba Specialty Chemical under the trade designation Irganox 1024. The concentration of the metal deactivator in the thermoplastic film composition is in the range of up to about 1% by weight, and in one embodiment about 0.2% to about 0.5% by weight.

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. An ink-receptive coating composition comprising:
   (A) from about 98 parts by weight to about 60 parts by weight of a polyester resin having a number average molecular weight (Mn) greater than 12,000,
   (B) from about 2 parts by weight to about 40 parts by weight of a polyester resin having a number average molecular weight (Mn) in the range of from about 2,000 to 12,000, wherein said parts by weight are based on the total weight of the polyester resin in the composition,
   (C) a polyisocyanate crosslinking agent and a polyaziridine crosslinking agent, and
   (D) a filler.

2. The coating composition of claim 1 wherein the filler is an inorganic filler.

3. The composition of claim 1 wherein the filler is present in an amount of from about 0.1 to about 10% by weight, based on the total weight of the polyester resin present in the composition.

4. The coating composition of claim 1 wherein the polyester resin (A) has an Mn in the range of from about 15,000 to about 40,000.

5. The coating composition of claim 1 wherein the polyester resin (B) has an Mn in the range of from about 3,000 to about 8,000.

6. The composition of claim 1 comprising from about 98 to about 80 parts by weight of the polyester resin (A) and from about 2 to about 20 parts by weight of the polyester resin (B).

7. The coating composition of claim 1 also comprising at least one organic solvent.

8. An ink-receptive coating composition comprising:
   (A) from about 98 parts by weight to about 60 parts by weight of a reactive polyester resin having a number average molecular weight (Mn) greater than 12,000,
   (B) from about 2 parts by weight to about 40 parts by weight of a reactive polyester resin having a number average molecular weight (Mn) in the range of from about 2,000 to 12,000, wherein said parts by weight are based on the total weight of the polyester resin in the composition, and (C) a polyisocyanate crosslinking agent and a polyaziridine crosslinking agent.

9. The coating composition of claim 8 wherein the polyester resin (A) has an Mn in the range of from about 15,000 to about 40,000.

10. The coating composition of claim 8 wherein the polyester resin (B) has an Mn in the range of from about 3,000 to about 8,000.

11. The composition of claim 8 comprising from about 98 to about 80 parts by weight of the polyester resin (A) and from about 2 to about 20 parts by weight of the polyester resin (B).

12. The coating composition of claim 8 also comprising at least one organic solvent.

13. An ink-receptive coating composition comprising:
  (A) from about 98 parts by weight to about 60 parts by weight of a reactive polyester resin having a number average molecular weight (Mn) greater than 12,000,
  (B) from about 2 parts by weight to about 40 parts by weight of a reactive polyester resin having a number average molecular weight (Mn) in the range of from about 2,000 to 12,000, wherein said parts by weight are based on the total weight of the polyester resin in the composition,
  (C) at least one crosslinking agent which is a polyaziridine, and
  (D) from about 50% to about 80% by weight of at least one organic solvent.

14. The coating composition of claim 13 wherein the polyester resin (A) has an Mn in the range of from about 15,000 to about 40,000.

15. The coating composition of claim 13 wherein the polyester resin (B) has an Mn in the range of from about 3,000 to about 8,000.

16. The composition of claim 13 comprising from about 98 to about 80 parts by weight of the polyester resin (A) and from about 2 to about 20 parts by weight of the polyester resin (B).

17. An ink-receptive coating composition comprising:
  (A) from about 98 parts by weight to about 60 parts by weight of a polyester resin having a number average molecular weight (Mn) greater than 12,000,
  (B) from about 2 parts by weight to about 40 parts by weight of a polyester resin having a number average molecular weight (Mn) in the range of from about 2,000 to 12,000, wherein said parts by weight are based on the total weight of the polyester resin in the composition,
  (C) at least one crosslinking agent which is a polyaziridine, and
  (D) from about 50% to about 80% by weight of at least one organic solvent, wherein the solvent comprises a mixture of methyl ethyl ketone, toluene and cyclohexanone.

18. The coating composition of claim 17 wherein the polyester resin (A) has an Mn in the range of from about 15,000 to about 40,000.

19. The coating composition of claim 17 wherein the polyester resin (B) has an Mn in the range of from about 3,000 to about 8,000.

20. The composition of claim 17 comprising from about 98 to about 80 parts by weight of the polyester resin (A) and from about 2 to about 20 parts by weight of the polyester resin (B).

21. An ink-receptive coating composition comprising:
  (A) from about 98 carts by weight to about 60 parts by weight of a polyester resin having a number average molecular weight (Mn) greater than 12,000,
  (B) from about 2 parts by weight to about 40 parts by weight of a polyester resin having a number average molecular weight (Mn) in the range of from about 2,000 to 12,000, wherein said parts by weight are based on the total weight of the polyester resin in the composition,
  (C) at least one crosslinking agent which is a polyaziridine,
  (D) from about 50% to about 80% by weight of at least one organic solvent, and
  (E) a filler.

22. The coating composition of claim 21 wherein the filler is an inorganic filler.

23. The composition of claim 22 wherein the filler is present in an amount of from about 0.1 to about 10% by weight, based on the total weight of the polyester resin present in the composition.

24. The coating composition of claim 21 wherein the polyester resin (A) has an Mn in the range of from about 15,000 to about 40,000.

25. The coating composition of claim 21 wherein the polyester resin (B) has an Mn in the range of from about 3,000 to about 8,000.

26. The composition of claim 21 comprising from about 98 to about 80 parts by weight of the polyester resin (A) and from about 2 to about 20 parts by weight of the polyester resin (B).

27. The coating composition of claim 21 wherein the solvent comprises a mixture of methyl ethyl ketone, toluene and cyclohexanone.

\* \* \* \* \*

UNITED STATES PATENT AND TRADEMARK OFFICE
CERTIFICATE OF CORRECTION

| | | |
|---|---|---|
| PATENT NO. | : 7,309,731 B2 | Page 1 of 1 |
| APPLICATION NO. | : 10/704515 | |
| DATED | : December 18, 2007 | |
| INVENTOR(S) | : Shih et al. | |

It is certified that error appears in the above-identified patent and that said Letters Patent is hereby corrected as shown below:

Column 22, line 16, replace "carts" with --parts--.

Signed and Sealed this

Twenty-seventh Day of May, 2008

JON W. DUDAS
*Director of the United States Patent and Trademark Office*